United States Patent

Degges et al.

[11] Patent Number: 5,953,329
[45] Date of Patent: Sep. 14, 1999

[54] INTELLIGENT, HIGH-SPEED SWITCHING MATRIX

[75] Inventors: Andrew McKinney Degges, Greensboro, N.C.; Michael Paul Overcash, Atlanta, Ga.; William Douglas Alexander, Alpharetta, Ga.; Eugene Harold Kreeft, Suwanee, Ga.

[73] Assignee: Preferred Networks, Inc., Norcross, Ga.

[21] Appl. No.: 08/918,457

[22] Filed: Aug. 26, 1997

[51] Int. Cl.$^6$ .................................................. H04L 12/28
[52] U.S. Cl. ............................................. 370/351; 370/410
[58] Field of Search ................................... 370/410, 378, 370/522, 524, 401, 351, 357, 360

[56] References Cited

U.S. PATENT DOCUMENTS

| | | | |
|---|---|---|---|
| 1,439,723 | 12/1922 | Blauvelt | 379/220 |
| 2,574,944 | 11/1951 | Voss | 379/275 |
| 2,602,122 | 7/1952 | Lesigne | 379/233 |
| 2,614,176 | 10/1952 | Dimond | 379/277 |
| 3,532,830 | 10/1970 | Wirsing | 379/220 |
| 3,571,517 | 3/1971 | Joel, Jr. | 379/207 |
| 4,442,321 | 4/1984 | Stehman | 379/220 |
| 4,831,649 | 5/1989 | Mejane | 379/111 |
| 5,119,366 | 6/1992 | Ardon et al. | 370/378 |
| 5,268,958 | 12/1993 | Nakano | 379/211 |
| 5,333,188 | 7/1994 | Bogart et al. | 379/220 |
| 5,787,355 | 7/1998 | Bannister et al. | 455/458 |

*Primary Examiner*—Chi H. Pham
*Assistant Examiner*—Kim T. Nguyen
*Attorney, Agent, or Firm*—Gregory Scott Smith, Esq.; Troutman Sanders LLP

[57] ABSTRACT

A switching system and a method for performing high-speed switching within a telecommunications system. One aspect of the present invention utilizes an internal host and a self learning routing algorithm to reduce the time required to identify an output channel for routing a communication. Thus, the overhead associated with querying an external database can be eliminated from the switching system allowing a switching system to reduce the call hold time, and thereby meet the call flow demands of the telecommunications system. Another aspect of the present invention is the use of a hashing algorithm in resolving routing decisions. The hashing algorithm operates on received DID numbers to identify an output channel for a received call. The hashing algorithm is able to accept any DID number as input. Therefore, this aspect of the present invention allows a switching system to quickly resolve routing decisions without requiring consecutive DID numbers. This aspect of the present invention also allows a switching system to perform true, ten digit portability of DID numbers. Another aspect of the present invention is buffering the data between various components of the telecommunications system to eliminate problems due to skew between the transmission clocks of the various components. This aspect of the present invention allows the transmission of the data to be delayed by at least one frame length and then uses the clock rate of the destination component to ensure that clock skew is eliminated.

15 Claims, 5 Drawing Sheets

INTELLIGENT, HIGH-SPEED SWITCHING MATRIX

TECHNICAL FIELD

The present invention relates to switching systems and, more particularly, relates to an intelligent, high-speed switching matrix that is dynamically configurable.

BACKGROUND OF THE INVENTION

Switching systems are used throughout the telecommunications industry for receiving and redirecting communications between parties. In a general configuration, a telecommunications switch interfaces with N trunks from one or more telephone service providers, and M trunks servicing one or more categories of equipment such as PBX's for office phone systems, other telecommunication switches, etc. A communication attempt received from one of the N trunks is then routed out an appropriate one of M trunks or vise versa.

In wireless telecommunications systems, such as paging systems, personal communication systems (PCS) and cellular systems, wireless switching systems are used for receiving and routing communications between parties. In general, the wireless switches perform the equivalent operations of long distance switches. During operation, a service provider receives a call setup attempt. If the call setup attempt is directed towards a number that is serviced by a wireless service provider, the call is routed to a wireless switching system operated by that wireless service provider.

One problem that wireless switching systems are confronted with is processing calls at a higher call flow rate than is required for non-wireless switching systems. In a typical non-wireless switching system, the maximum call flow rate or the worst case call flow rate is on the order of one call every 30 seconds. In normal operation (non-worst case), non-wireless switching systems are required to process calls at a rate of one call every 60 to 90 seconds. However, in wireless applications, especially in a paging system, the call flow rate is on the order of one call every 8 to 10 seconds. The increased call flow rate is due to the fact that the duration of a paging call is significantly less than the duration of a typical telephone call. Thus, current state of the art switching systems are not able to process calls at the flow rate required for typical wireless applications. Even current state of the art wireless switching systems are not able to process calls at these higher flow rates. This inadequacy of current state of the art switches results in increasing the number of blocked calls or unsuccessful call setup attempts. In order to alleviate blocked calls, service providers are forced to provide additional lines to adequately service their customers. Although this technique may reduce the number of blocked calls, it is an inefficient utilization of bandwidth. Therefore, there is a need in the art for a wireless switching system that meets the call flow demands of a wireless switching system while maintaining an efficient utilization of the bandwidth.

One problem that contributes to the inability of current state of the art switching systems to meet the call flow demands of a wireless communication system is the inefficient use and assignment of phone numbers within the telecommunications system. Until recently, phone numbers were sold in blocks of 100 (centi-records). Recently, due to fragmentation, this has been reduced to blocks of 10 (deca-records). The inefficiency of the current system is realized when attempting to receive a call at the switch and route it out the appropriate trunk.

In typical operation, each call received at a switch includes a destination identifying number or DID (direct inward dialing) number. The DID number identifies the called party, and thus, is examined to determine on which trunk to output the call from the switch. For instance, if a paging system is serviced by a single wireless switch, the DID of the received call is used to determine which output channels to route the call over.

In switching systems representing the state of the art, this is accomplished by assigning hunt groups to contiguous blocks of DID numbers. Each hunt group consists of one or more DS0 channels (i.e., DS0 1–6) that are used to service a block of 100 DID numbers. The hunt groups are dedicated to blocks of DID numbers in this manner to reduce the amount of time required for forwarding the call. For example, a DID of 436–5024 will result in selecting a hunt group associated with all 100 numbers that start with 43650 (e.g., 436–5000 to 436–5099). Thus, the least significant numbers of the DID are masked off, and only the most significant digits must be examined to identify the correct hunt group. This results in reducing the amount of time required to examine the DID number and identify a hunt group.

The inefficiency of this technique is apparent when a switch operator is only able to purchase DID numbers in blocks of 10. This results in having a hunt group that is capable of servicing 100 DID numbers, being dedicated to a block of only 10 DID numbers. The inefficiency of this technique is even more apparent when the fragmentation of the numbers results in blocks of DID numbers that are less than 10.

One technique to resolve this problem is to assign DID numbers to hunt groups at a higher resolution (i.e., on a number by number basis). For instance, rather than masking off the insignificant digits of a DID number, the entire DID number can be examined and assigned to a hunt group. A problem associated with this technique is that the efficiency obtained by assigning blocks of contiguous DID numbers to a hunt group is lost. Thus, the amount of time required to identify the appropriate hunt group and route the received call accordingly results in the inability of the switch to meet the call flow requirements. Therefore, there is a need in the art for a switching system that can assign non-contiguous blocks of DID numbers to a hunt group and still meet the call flow requirements of the telecommunications system.

Another problem that contributes to the inability of current state of the art switching systems to meet the call flow demands of a wireless communication system is the techniques used to match DID numbers with hunt groups. Typical switching systems rely on the use of a host system, located external of the switching system, for performing this function. Thus, when a call and DID number is received, the external host must be queried with the DID number to identify the appropriate hunt group. The overhead associated with querying the external host contributes to the slow response time of the switching system in processing the call. Therefore, there is a need in the art for a switching system that eliminates or reduces the overhead associated with querying an external host to match a DID number with the appropriate hunt group.

Another problem that wireless switching systems are confronted with is the ability to provide true, ten digit portability of the DID numbers. The typical DID numbering scheme in the US consists of segmenting a ten digit number into three parts: (a) an area code ("NPA"); (b) a local exchange ("NXX"); and (c) a line serviced by the local exchange ("YYYY"). Thus, a ten digit DID number is represented as NPA-NXX-YYYY and can range over a domain of 10 billion possible numbers.

State of the art switching systems are limited to operate on a subset of the 10 billion domain of numbers available. Typically, a switching system is limited to a single NPA and NXX, thereby, limiting the possible numbers serviced by the switching system to 10,000 possible numbers. More typically, to be able to efficiently process the 10,000 possible numbers within a given NPA-NXX region, several switching systems will be utilized. Thus, any given switching system is only required to process blocks of the 10,000 available numbers, usually in block sizes of 100 or 10.

In today's telecommunications environment, this technique imposes significant design requirements in the design of the telecommunications system. Considerable effort is required to distribute the load of each switching system to ensure that a given switching system services as many contiguous blocks of DID numbers as possible.

In order to provide true, ten digit portability, a switching system must be able to process any of the possible 10 billion different numbers available. A switching system with this capability can be used to service numbers without being limited to a specific NPA-NXX. This would allow a single switch to process calls to an 800 number, local calls within a specific NPA-NXX area, and long distance calls with various NPA's and NXX's. This would allow greater flexibility in the design of the telecommunications system and reduce the cost for servicing various calling requirements. Therefore, there is a need in the art for a switching system that has the ability to perform true, ten digit portability of the DID numbers.

Another problem that wireless switching systems are confronted with is realized when a single switching system is used to route calls between various carriers using differing communication protocols and transmission characteristics. In general, each carrier can utilize its own communication protocol and generate its own timing characteristics for transmitting information. Thus, if a switching system is required to route a call from carrier A to carrier B, the switching system must route the call from carrier A, through a switching system compatible with carrier B. Carrier B usually charges a fee for providing this service. Thus, typical switching systems limit the variety of carriers that they service so that costs for routing the calls can be minimized. Therefore, there is a need in the art for a switching system that can communicate with any type of equipment or carrier without limitation.

Yet another problem that wireless switching systems are confronted with is the requirement to be reconfigured when the characteristics of the telecommunications system changes. State of the art switching systems are configured prior to going on line. Thus, the hunt groups for a switching system and DID numbers associated with the hunt groups are defined at the onset. Once the switching system goes on line, if one of the hunt groups is over burdened (i.e., is not able to process the required call flow) the switching system must be taken off-line and reconfigured. This results in downtime during which the customers can not be serviced and the service provider loses revenue. Thus, there is a need in the art for a switching system that can be configured in real-time while the switching system is operating within the telecommunications system.

SUMMARY OF THE INVENTION

The present invention provides an intelligent, high-speed switching system or matrix for use in both wireless and non-wireless telecommunication systems. In general, the switching system of the present invention is able to meet the call flow demands of a wireless switching system while maintaining efficient utilization of the bandwidth.

More specifically, the switching system of the present invention provides a non-blocking switching function to various components of a telecommunications system. In one embodiment of the present invention wherein the switching system provides a switching function to T1 carrier systems, 2016 T1 channels are switched.

The switching system includes one or more interface devices with each of the interface devices being able to receive and transmit data over the 24 channels of a T1 frame transferred between the interface device and a component within the telecommunications system. Each interface device includes a controller system and a memory system. The memory system includes an incoming data buffer that provides a unique memory storage location for each of the 24 channels received by the interface device, and an outgoing data buffer that provides a unique memory storage location for each of the 24 channels received by each of the interface devices. A system bus is used for transferring information from each unique memory storage location in the incoming data buffers of each of the outgoing data buffers in each of the interface devices.

During operation, an interface device of the switching system detects a communication initiation on an input channel received from a component functionally connected to the interface device. The interface device then extracts a destination identifier from the input channel. In one embodiment, the destination identifier is a 10 digit DID number. The destination identifier uniquely identifies the destination component intended for the initiated communication.

The switching system then operates to identify an available output channel associated with the destination component. This is accomplished by the interface device that detected the communication initiation querying an internal host electrically coupled to each of the interface devices. Advantageously, the use of an internal host reduces the overhead associated with querying an external host to match a destination identifier or DID number with an output channel.

The internal host includes a routing database providing an association between each of the destination identifiers that can be received by the switching system and the hunt groups containing channels servicing the destination identifiers. The hunt groups identify an interface device associated with the destination component and at least one output channel of the T1 frame transmitted by the interface device to the destination component.

To identify an available output channel, the destination identifier is provided to a hashing algorithm within the internal host. The use of a hashing algorithm advantageously allows the switching system to service non-contiguous blocks of DID numbers and still meet the call flow requirements of the telecommunications system. The use of a hashing algorithm also advantageously allows the switching system to perform true, ten digit portability of the destination identifiers or DID numbers. The hashing algorithm generates a database key from the destination identifier. The database key is then used to access the routing database and retrieve a hunt group. Finally, the internal host examines each of the output channels identified by the hunt group to determine if an available output channel exists. If an available channel is identified, a virtual connection is established between the input channel and the available output channel through the memory system and the system bus.

The virtual connection between the input channel and the output channel includes the unique memory location in the incoming data buffer reserved for the input channel and the unique memory location in the outgoing data buffer reserved for the input channel. As data is received by the interface device servicing the input channel, the data is stored into the unique memory location for that input channel. The system bus continuously transfers data from the incoming data buffers to the outgoing data buffers. The interface device servicing the output channel extracts data from the unique memory location reserved for the input channel in the outgoing buffer and injects the data into the appropriate output channel of the transmitted T1 frames.

Each of the interface devices within the switching system of the present invention is functional to detect a signaling clock embedded within the T1 frames received from a component within the telecommunications network. This detected clock is then used as the basis for transmitting data to the destination components. This aspect of the present invention advantageously allows the switching system to provide a switching function to various types of equipment or service providers. Any skew that may exist between the clock rates of the various equipment or service providers is eliminated by using the detected embedded clock rate.

Another aspect of the present invention is providing real-time billing information. The interface devices of the switching system operate to detect communication terminations on the input channels of the T1 frames. Upon detecting a communication termination, the interface device operates to terminate the virtual connection between the source component and the destination component. The interface devices are also operative to extract a source identifier from the input channel. The source identifier is used to identify the originating component. During the call processing, the interface device records the start time when the virtual connection is established, the end time when the virtual connection is terminated and the source identifier. This information is then provided in real-time to a billing system that can be functionally connected to the switching system.

Another aspect of the present invention is the ability to reconfigure the switching system while it is on-line. Each of the interface devices are connected through the use of a bus system. The interface devices are connected to the bus system through trapezoidal drivers. The trapezoidal drivers are open collector devices, thus allowing interface devices to be inserted or removed from the system bus while the switching system has power applied. In addition, a user interface is provided for modifying the routing database. Thus, the switching system can be hooked up to additional trunk lines, detached from trunk lines, and reconfigured through the user interface while the switching system is on-line.

These and other aspects, features, and advantages of the present invention will be more clearly understood and appreciated from a review of the following detailed description of the present invention and possible embodiments thereof, and by reference to the appended drawings and claims.

DETAILED DESCRIPTION

The present invention provides an intelligent, high-speed switching system or matrix for use in both wireless and non-wireless telecommunication systems. Now turning to the figures in which like numerals refer to like elements throughout the several figures, aspects of the present invention embodied within an exemplary switching system are described.

Figure 1:
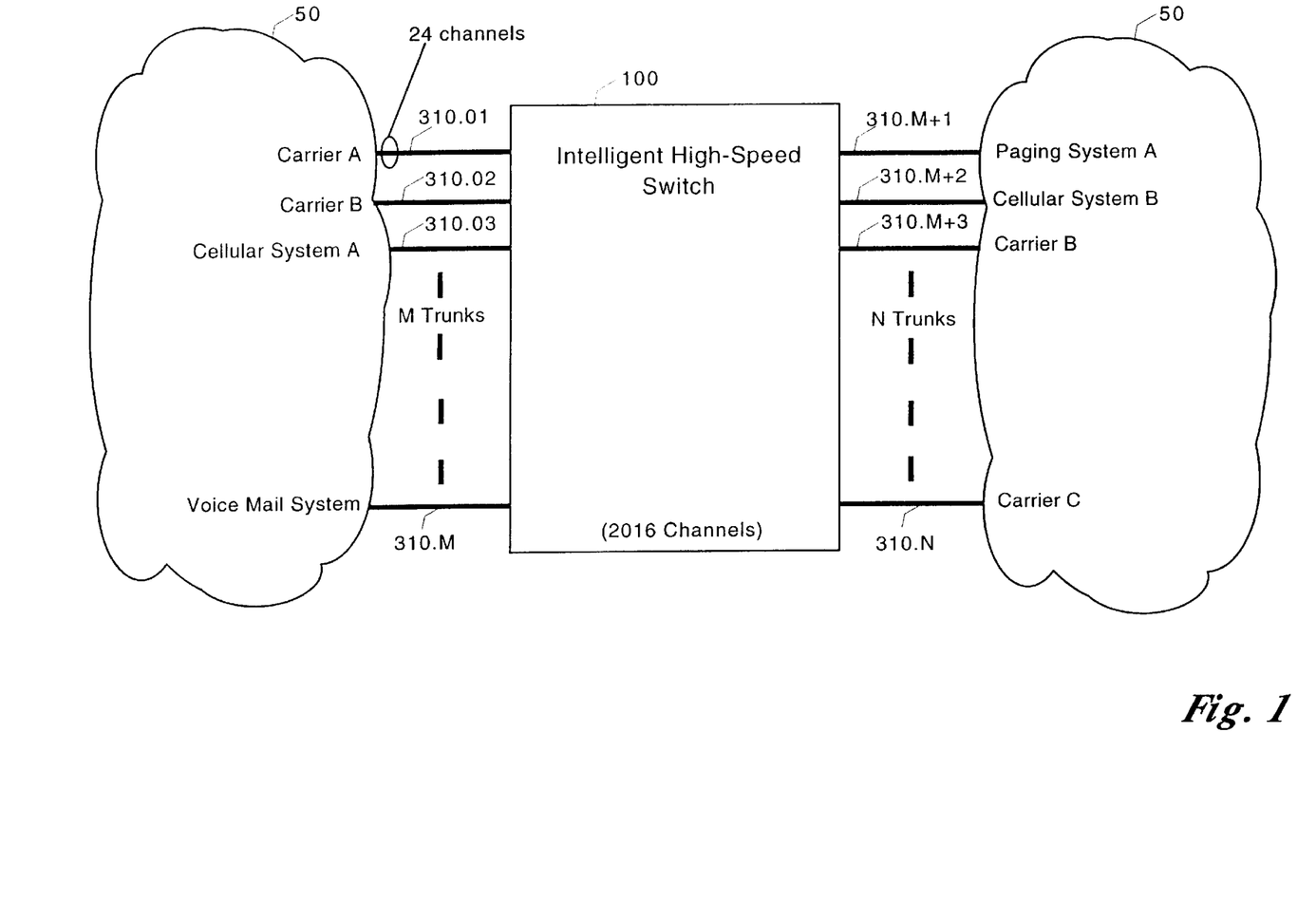
FIG. 1 is a system diagram illustrating the intelligent, high-speed switching system of the present invention, integrated into a telecommunications system.

FIG. 1 is a system diagram illustrating the intelligent, high-speed switching system of the present invention, integrated into a telecommunications system. The switching system 100 interfaces to a telecommunications system 50 through one or more trunk lines. Each of the trunk lines is able to receive data from and transmit data to a component within the telecommunications system.

In an exemplary embodiment, each trunk line utilizes a T1 carrier frame for providing bi-directional bit streams at the rate of 1.544 Mbits/sec. However, the trunk lines could also include other T-carrier facilities, such as T1C, T2, T3, and T4 carriers, conform to the European standard transmission rate of 2.048 Mbits/sec, or use some other transmission method. For purposes of discussion, the present invention will be described as interfacing to the telecommunications system with T1 carriers.

Those skilled in the art will be familiar with the frame structure and operation of a T1 carrier. In describing the present invention, it is only necessary to understand that each T1 frame includes 24 time-division multiplexed, bidirectional, 8-bit channels (DSO-1 to DSO-24) and a synchronization bit for a total of 193 bits per frame. Each of the channels is available for receiving (or transmitting) data every 125 $\mu$secs. The switching system 100 interfaces to various components within the telecommunications system over trunk lines carrying 24-channel T1 carriers. In FIG. 1, the switching system 100 interfaces to Carrier A over trunk 310.01, Carrier B over trunks 310.02 and 310.M+3, Cellular System A over trunk 310.03, a Voice Mail System over trunk 310.M, Paging System A over trunk 310.M+1, Cellular System B over trunk 310.M+2, and Carrier C over trunk 310.N.

An exemplary switching system embodying the present invention can interface with as many as 84 trunk lines for processing up to 2016 channels. It should be understood that the present invention is not limited to this configuration, but rather, the present invention could also be embodied in a switching system for switching either more or fewer channels. Conventional switching systems are classified by the number of lines they service. For instance, the switching system in FIG. 1 is shown as an M×N switch allowing any of M trunks to be connected to any of N trunks. The switching system of the present invention is dynamically configurable so that any particular channel of any trunk can be connected with any other channel serviced by the switching system. Thus, if the switching system of the present invention services Z channels, the switching system could be classified as an Z×Z switch.

General Call Flow Processing

Figure 2:
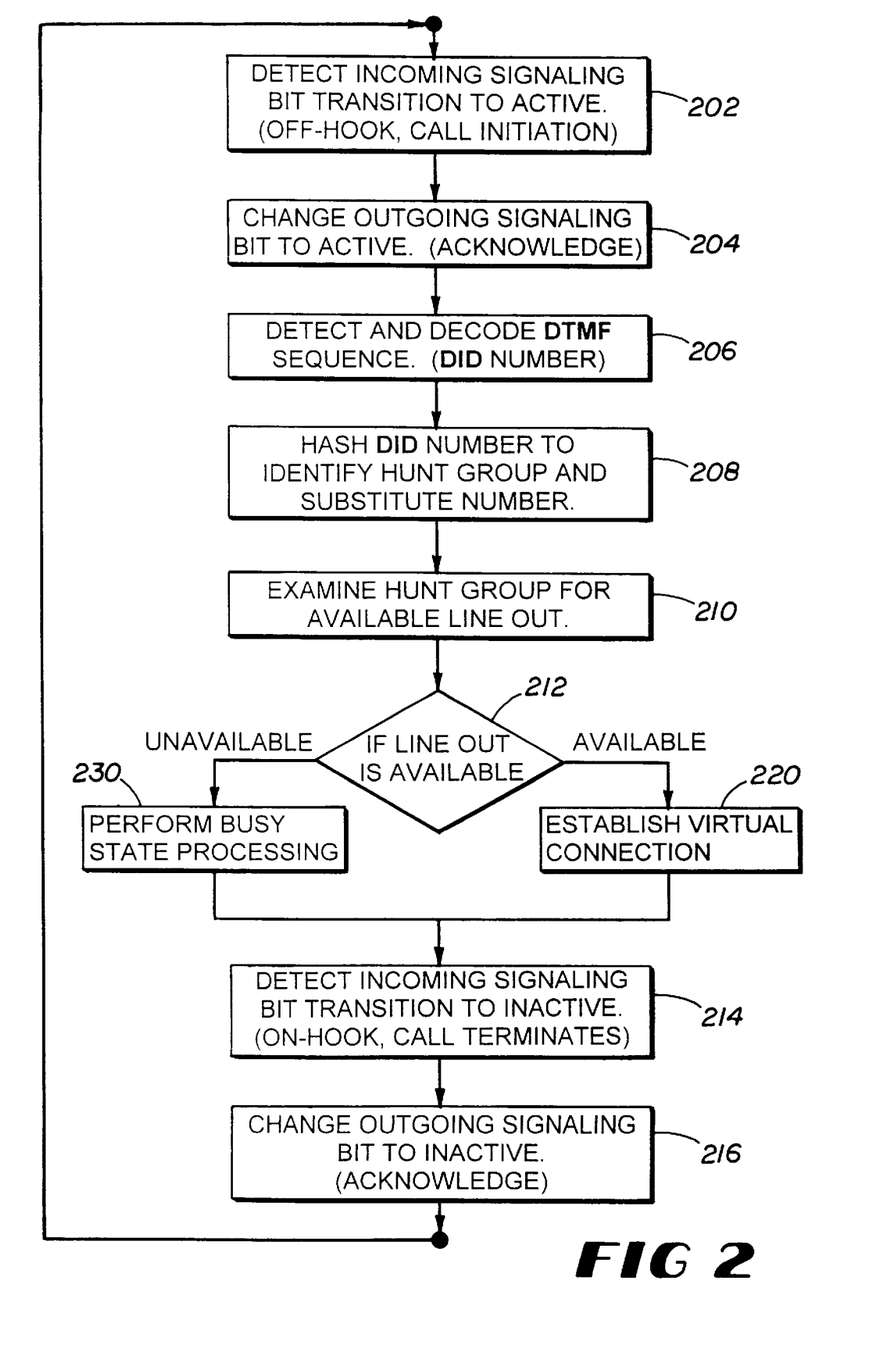
FIG. 2 is a flow diagram illustrating the general operation of an exemplary switching system when processing a call between an originating component and a destination component.

FIG. 2 is a flow diagram illustrating the general operation of an exemplary switching system when processing a call between an originating component and a destination component. At step 202, the switching system detects a call initiation on an input channel of the T1 frames being transmitted by the originating component. The call initiation is indicated by a transition of an incoming signaling bit to an active state. The transition of this bit is synonymous with the off-hook condition of a telephone. In response to detecting the transition of the incoming signaling bit, an acknowledgment is provided to the originating component at step 204. The acknowledgment is provided by a transition of an outgoing signaling bit to an active state. Once the call setup request is acknowledged, pulse code modulated (PCM) DTMF encoded signals are transmitted by the originating component to the switching system over several consecutive T1 frames. At step 206, the switching system detects and decodes the DTMF sequence to recover a DID number. The DID number identifies the intended destination for the call. In the exemplary embodiment, the DID numbers are 10-digit telephone numbers assigned to subscriber lines, equipment, telecommunications systems, or the like.

At step 208 the DID number is processed by a hashing algorithm to identify a hunt group servicing the DID number, and if necessary, to translate the DID number into a substitute number. The use of the hashing algorithm is a key aspect of the present invention. The hashing algorithm allows the switch to process any of the available DID numbers. In the exemplary embodiment, the use of 10-digit DID numbers results in a domain of available DID numbers ranging from 000 000 0000 to 999 999 9999 or 10 billion numbers. The present invention allows an exemplary switching system to be configured to accept any subset of DID numbers selected from the domain of 10 billion DID numbers. This is advantageous over current switching systems in which their performance relies upon the use of contiguous blocks of DID numbers.

A hunt group is a logical partition of the channels available to the switch. All of the channels serviced by the switching system are assigned to one of several hunt groups. Each hunt group can be assigned as few as two channels and as many 2016. As an example, 48 channels are associated with Carrier B in FIG. 1, 24 on trunk 210.02 and 24 on trunk 210.M+3. In one embodiment, all 48 of these channels are assigned to a single hunt group. In another embodiment, the 48 channels are partitioned into 24 hunt groups with two channels in each hunt group. Other embodiments are also anticipated by the present invention and the particular assignments of hunt groups depends on the configuration and requirements of the switching system.

In an exemplary switching system, a routing database defines the relationship between DID numbers that can be received by the switching system and the hunt groups servicing the DID numbers. In addition, the routing database may also define substitute numbers for the DID number. The substitute numbers are used when the received DID number does not directly correlate with the telephone number assigned to the intended destination. For example, if the DID number is a personal number used to access a party at one of several locations, the DID number may be substituted with a number corresponding to one of the several locations.

At step 210 each of the output channels assigned to the hunt group identified in step 208 are examined to identify an available output channel. At step 212, if an available output channel is identified, processing continues at step 220. Otherwise, processing continues at step 230.

At step 220 an available output channel within the identified hunt group has been identified. A virtual connection is then established for servicing the remainder of the call. The virtual connection provides a path for transferring data between the originating component and the destination component. The originally received DID number or the substituted DID number is included in the information routed over the virtual connection. Data continues to be transferred between the originating component and the destination component until a call termination is detected. At step 214 the switching systems detects a transition of the incoming signaling bit to the inactive state. The transition of the incoming signaling bit to the inactive state indicates that the originating component or the destination component has terminated the call. This is synonymous to a telephone be placed in the on-hook state. Processing then continues at step 216 where the switching system acknowledges the call termination by a transition of the outgoing signaling bit to the inactive state. Finally, processing returns to step 202 to process additional call setup requests.

At step 230 all of the output channels in the hunt group are unavailable. Under this condition, busy state processing is performed. In various embodiments, the busy state processing may include: (a) providing a busy indication, such as a message or tone, to the originating equipment; (b) continuously examining the channels of the hunt group until a channel is available (camp-on ringing); (c) utilizing a channel that is not currently assigned to a hunt group; or (d) borrowing a channel assigned to a different hunt group. Either of these methods or alternative methods could be used for busy state processing and the present invention is not limited to any particular method. In either case, the busy state processing continues until a call termination is detected and processing continues as described above starting with step 214.

General Structure of an Exemplary Switching System

Figure 3:
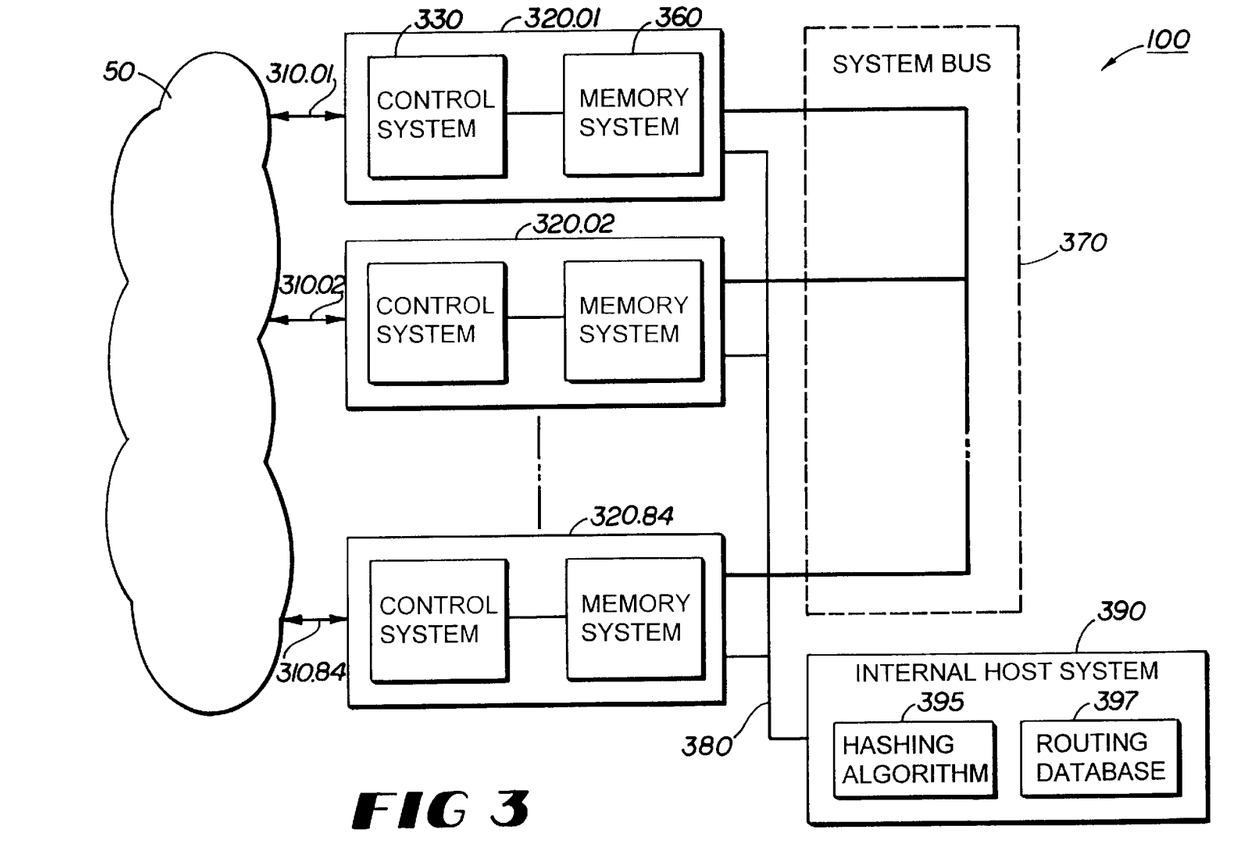
FIG. 3 is a block diagram illustrating the various components included within an exemplary switching system embodying the present invention.

FIG. 3 is a block diagram illustrating the various components included within an exemplary switching system embodying the present invention. The switching system 100 includes one or more T1 interface cards 320.xx, a system bus 370, and an internal host system 390. The switching system 100 interfaces to the telecommunications system 50 over at least one (1) and as many as 84 trunk lines. Within an exemplary switching system 100, each T1 interface card 320 is used to service a single trunk line. In other embodiments, a T1 interface card 320 may be capable of servicing multiple trunk lines, or two or more T1 interface cards 320 may be used to service a single trunk line. In FIG. 3, the switching system interfaces to 84 trunk lines 310.01–310.84 via 84 T1 interface cards 320.01–320.84.

Each of T1 interface cards 320.01–320.84 includes a control system 330 and a memory system 360. The control system 330 interfaces to the trunk line and is operative to: (a) receive T1 frames from the trunk line; (b) detect the initiation of a call or a request for service; (c) establish a virtual connection between an input channel and an output channel; (d) remove input data from each of the 24 channels of the T1 frames; (e) store the input data into the memory system 360; (f) retrieve data from the memory system 360; and (g) place the data into channels of the T1 frames to be transmitted over the trunk line.

The control system 330 is functionally connected to the memory system 360. The memory system 360 is used to store data received from the trunk line being serviced by the T1 interface card 320 and data to be transmitted out the trunk line. Data is transferred from various locations in the memory system over a high-speed system bus 370.

The control system 330 of each of the T1 interface cards 320.01–320.84 also interfaces with an internal host system 390 over an interface 380. The internal host 390 embodies a hashing algorithm 395 and a routing database 397.

Internal Host

Figure 4:
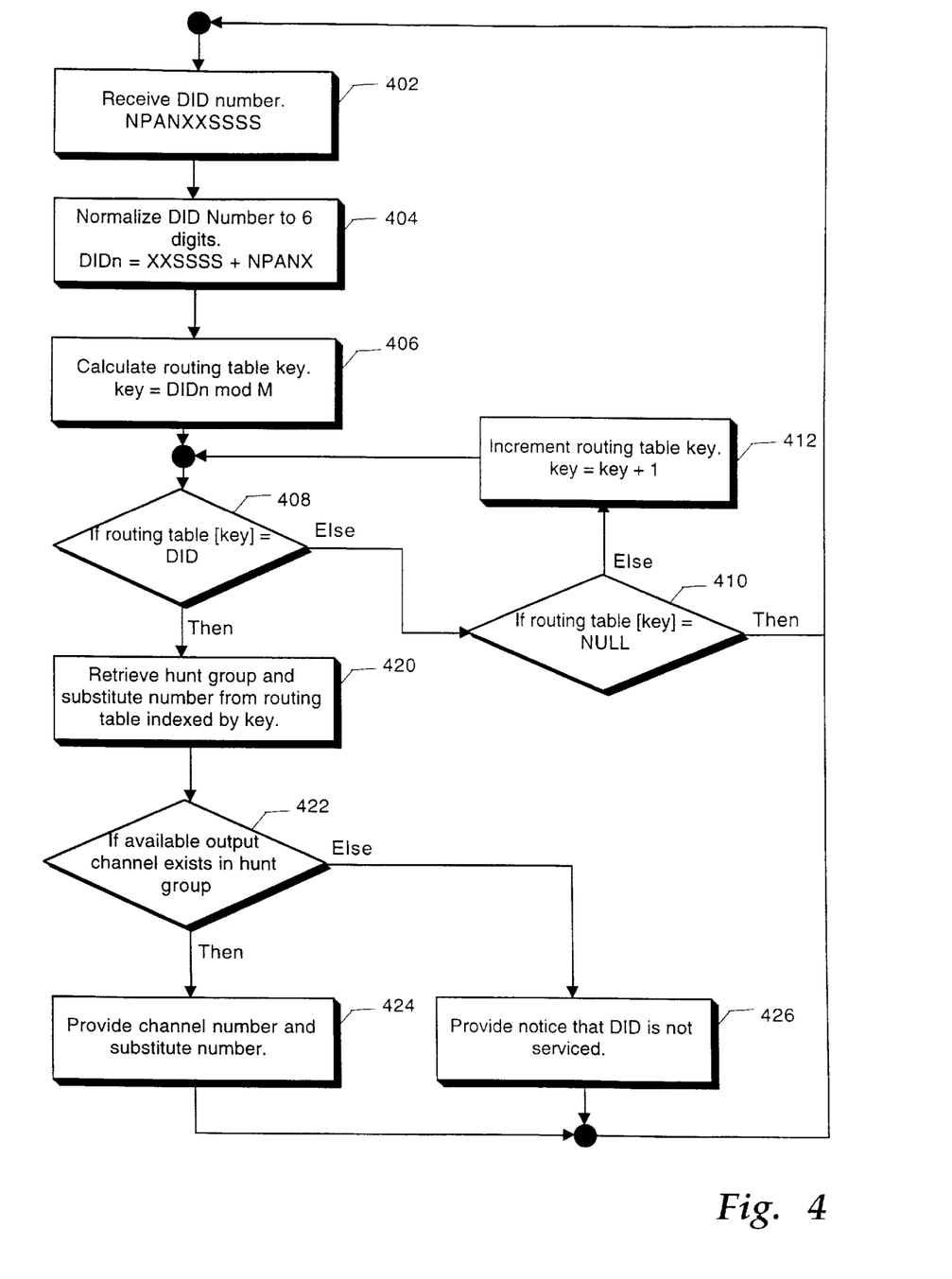
FIG. 4 is a flow diagram illustrating the operation of the internal host system, the hashing algorithm, and the routing database of FIG. 3.

FIG. 4 is a flow diagram illustrating the operation of the internal host system 390, the hashing algorithm 395, and the routing database 397. At step 402 the internal host 390 receives a DID number (NPANXXSSSS) from one of the T1 interface cards 320. The internal host 390 responds to the requesting T1 interface card in one of three ways: (1) by providing an available channel number and a substitute number if necessary; (2) by indicating that all of the channels for the hunt group associated with the DID number are busy; or (3) by providing an indicator that the DID number is not serviced by this switching system.

More specifically, the internal host responds by determining whether the DID number is serviced by the switching system. This determination is made by using the DID number as input to the hashing algorithm 395. The hashing algorithm, illustrated in steps 404 and 406 of FIG. 4, operates to normalize the DID number to a six (6) or seven (7) digit number at step 404 by taking the sum of the six (6) least significant digits and the five (5) most significant digits divided by 100,000. At step 406, the hashing algorithm operates to calculate a database key for accessing the routing database. The database key is calculated by applying Homer's algorithm for performing a modulus M operation on the normalized DID number (DIDn), where M=173. Homer's algorithm is well known to those skilled in the art as a method for producing equipartitioned indices. A description of Homer's algorithm can be found in *Sorting and Searching Volume III*, Donald Knuthe, Addison Wesley, 1973, pgs. 506–549. Processing then continues at step 408.

At step 408 the internal host system 390 accesses the routing database 397 with the calculated database key. The routing database 397 supports up to 1 million subscribers or DID numbers and contains a hunt group identifications and possibly a substitute number for each DID number serviced by the switching system.

This aspect of the present invention allows for efficient number usage within a telephone switching system. Rather than masking off the least significant digits, the entire number is used within the hashing function to identify a correct hunt group. The use of a hashing function to identify a hunt group for a DID is much faster than previous techniques and it allows numbers to be assigned to a hunt group at a one number resolution rather than in blocks of 10 or 100 consecutive numbers. Thus, the requirement for large blocks of consecutive numbers is no longer necessary for the purpose of efficiency.

This aspect of the present invention also allows real-time number translation to be performed within the switching system. For instance, if a customer subscribes to a routing service, calls received may be routed to different numbers based on the time of day the call is received, the identification of the calling party, and other similar parameters. Current state of the art systems utilize databases that are external to the switch in order to perform this function. However, the present invention allows the number translation to occur utilizing a host system located internal to the switching system. Thus, the lookup time is reduced a significant amount thereby improving trunk utilization efficiency or reducing call hold time.

If the routing database indexed by the database key contains an entry for the received DID, then processing continues at step 420. At step 410, if the routing database indexed by the database key contains a NULL entry or is empty, then the DID number is not a valid number (i.e., is not serviced by the switching system). Under this scenario, processing returns to step 402. Otherwise, the database key is incremented at step 412 and processing resumes from step 408 as described above.

At step 420, a hunt group is identified in the routing database for the received DID number. At step 422, the internal host attempts to identify an available output channel by examining the channels assigned to the hunt group. If an available channel is identified, the internal host 390 provides the channel number and a substitute number to the T1 card servicing the output channel and the T1 card servicing the input channel at step 424. If an available channel is not identified or the DID number is not serviced by the switch, processing continues at step 426. At step 426 the internal host 390 notifies the requesting T1 interface card that the DID number is not serviced by the switching system 100.

Structure and Operation of T1 Interface Card

Figure 5:
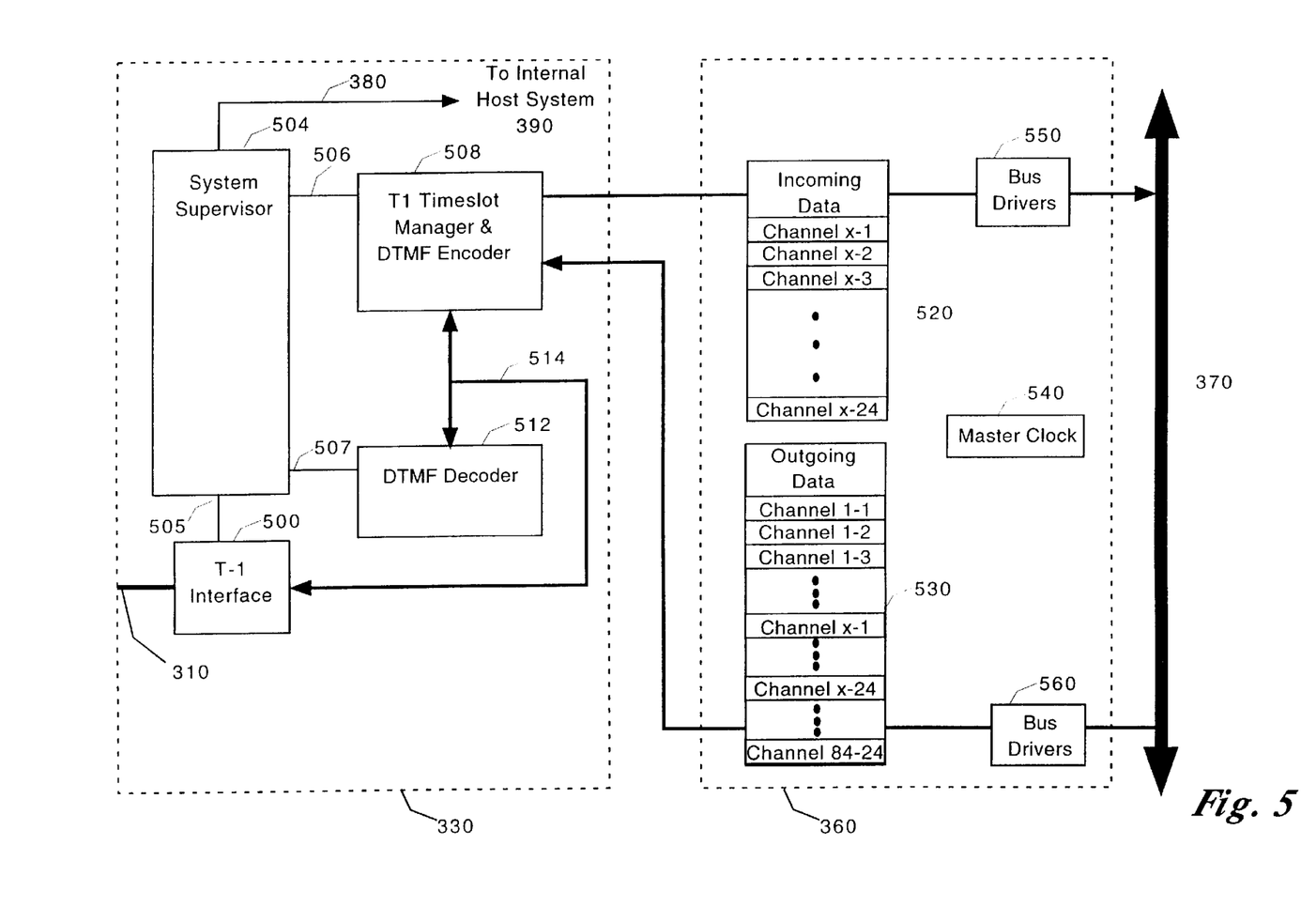
FIG. 5 is a block diagram illustrating further details of the functional components within a T1 interface card that may be used within an exemplary switching system embodying the present invention.

FIG. 5 is a block diagram illustrating further details of the functional components within a T1 interface card that may be used within an exemplary switching system embodying the present invention. As previously described, each T1 interface card includes a control system 330 and a memory system 360.

The control system 330 includes the functional components of a T1 interface 500, a system supervisor 504, a T1 time slot manager 508, and a DTMF decoder 512. The system supervisor 504 controls the overall operation of the control system 330. The system supervisor 504 controls the operation of the T1 interface over interface 505. The system supervisor controls the operation of the T1 time slot manager 508 over interface 506. The system supervisor 504 controls the operation of the DTMF decoder 512 over interface 507. Although the control system 330 has been described as including various functional components and interfaces, other configurations could also be employed as long as the functionality described below is provided. Each of the functional components within the control system 330 may consist of hardware components, software, or a combination of both.

Under the control of the system supervisor 504, the T1 interface 500 receives pulse code modulated (PCM), T1 framed data from a trunk line 210 at the rate of 1.544 MHz. The T1 interface 500 operates to demodulate the data, convert the data to TTL signal levels, and serially clock the data into a first-in-first-out memory queue. In an exemplary embodiment, the memory queue can buffer two complete T1 frames or 386 bits of data. After 386 bit times, the data is clocked out of the T1 interface 500 on interface 514 and is available to the T1 time slot manager 508 and the DTMF decoder 512.

The T1 interface 500 also operates to examine the received T1 framed data to identify a transition of the incoming signaling bit to the active (high) state. A transition of the incoming signaling bit to the active state indicates that an originating component is initiating a call. When the T1 interface 500 detects a transition of the incoming signaling bit, notification is provided to the system supervisor 504. This notification includes providing the system supervisor 504 with the channel number of the active channel. The system supervisor 504 responds to the notification by instructing the DTMF decoder 512, via interface 507, to monitor the active channel for DTMF signals representing a DID number. The system supervisor 504 also instructs the T1 interface to transition the outgoing signaling bit of the active channel to the active state, thereby providing acknowledgment to the originating component.

The DTMF decoder 512 receives TTL data from the T1 interface 500 over interface 514. To detect and recover a DID number on an active channel, the DTMF decoder collects data from several T1 frames. Once a valid DID number has been decoded, the DTMF decoder 512 provides the DID number to the system supervisor 504 over interface 507.

At this point, the system supervisor 504 has a valid DID number and an active input channel number. The system supervisor 504 provides the DID number to the internal host system 390 over interface 380. If the DID number is valid for the switching system and an output channel is available, the internal host 390 provides the system supervisor 504 with the identity of the output channel, and if necessary, a substitute number. If the output channel is serviced by a separate T1 interface card, the internal host also provides the system supervisor of the T1 interface card with the active input channel number and the output channel number.

In an exemplary embodiment, the system supervisor 504 also includes a self learning algorithm for maintaining a list of previously received DID numbers and the hunt groups associated with the DID numbers. Thus, the internal host system is only queried the first time a given DID is received. Subsequent to the first query, the system supervisor and determine the routing information independently of the internal host system 390. This advantageously allows the T1 interface card to route a received call without requiring an access of the internal host system 390.

After receiving the identification of an output channel, the system supervisor 504 provides the identification of the active input channel, the output channel, and the substituted number to the T1 time slot manager 508. The T1 time slot manager 508 operates to DTNF encode the received substituted number and extract data from active input channel on the TTL data stream received over interface 514. In realtime, the T1 time slot manager 508 provides the DTMF encoded number and the data received on the active input channel to the memory system 360.

The memory system includes an incoming data buffer 520, an outgoing data buffer 530, and bus drivers for interfacing to the system bus (370 in FIG. 3). The configuration and operation of the incoming data buffers can best be described with reference to FIGS. 3 and 5. The switching system 100 includes 84 T1 interface cards 320.01–320.84. Each T1 interface card 320.01–320.84 services 24 channels of a single trunk. The serial data received from a trunk line is stored in parallel in the incoming data buffer 520 with one byte of memory being used for each channel. In an exemplary embodiment, each T1 interface card provides memory storage space for each of the 2016 channels serviced by the switching system. However, prior to installing the T1 interface card into the switching system, the T1 interface card is configured to use only a portion of the incoming data buffer 520 (i.e., only 24 channels worth of memory space). Each of the T1 interface cards in the switching system are configured such that each card utilizes a unique set of memory locations for storing the received data. One 8-bit byte of memory space is reserved for each channel. Thus, each T1 interface card can buffer one complete 24 channel T1 frame at once. In FIG. 5, the incoming data buffer 520 for T1 interface card 220.0x is illustrated. The memory reserved for each channel is labeled as Channel x-1 through Channel x-24.

The outgoing data buffer 530 on each T1 interface card provides one frame of storage memory for each channel serviced by the switching system. Thus, the outgoing data buffer 530, at a minimum, includes 2016 bytes. In an exemplary embodiment, the addresses in the outgoing data buffer 530 directly correspond with the addresses in the incoming data buffer 520. For instance, if addresses 1–24 are reserved in the incoming data buffer 520 of T1 interface card 220.01, then address 1–24 are reserved in the outgoing data buffer 530 of all of the T1 interface cards 220.01–220.84. Channel x-1 through Channel x-24 are also illustrated in the outgoing data buffer 530. Other memory configurations and addressing schemes could also be employed and the present invention is not limited to any particular technique. In general, the memory system must provide a deterministic method for associating the various channel numbers with the received data.

The data stored in the incoming data buffers 520 are transferred into the outgoing data buffers 530 over a high speed parallel bus under the control of a master clock 540. Bus drivers 550 and 560 are used to interface the incoming data buffer 520 and the outgoing data buffer 530 to the high speed system bus 370. In an exemplary embodiment, the bus drivers 550 and 560 are trapezoidal drivers for converting and reverting the received data into bi-polar NRZ signals at a level of 1 volt. Use of the trapezoidal drivers advantageously allows the T1 interface cards to be inserted or removed from the switching system without requiring the system to be powered off.

Every 125 $\mu$secs, or each frame time, a complete memory transfer is performed between the incoming data buffers 520 and the outgoing data buffers 530 over the system bus 370. The memory transfer includes retrieving the data from the incoming data buffers 520 of each T1 interface card 220.01–220.84 and storing the data into the outgoing data buffers of each of the T1 interface cards 220.01–220.84. Thus, each outgoing data buffer 530 maintains an image of all of the input channels serviced by the switching system (2016 in an exemplary embodiment).

The T1 time slot manager 508 also operates to accumulate data to be transmitted in T1 frames over the trunk line. As previously described, the system supervisor 504 provides the T1 time slot manager with information associating input channels with output channels. During operation, the T1 time slot manager 508 accesses the outgoing data buffer 530 to retrieve data to be transmitted on the various channels of the T1 frame. For each output channel time slot of a T1 frame, the T1 time slot manager accesses the outgoing data buffer at the location reserved for the active input channel virtually connected to that output channel, retrieves the stored data, and then injects the data into a serial TTL data stream provided to the T1 interface 500 over interface 514. For instance, if input channel x-3 is virtually connected with output channel x-24, the T1 time slot manager will read the data at location channel x-3 from the outgoing data buffer and insert the data into the next available channel x-24 time slot of the TTL data stream.

The T1 interface 500 receives the TTL data stream from the T1 time slot manager over interface 514. The T1 interface 500 includes a framer circuit used to match the transmission clock of the T1 interface card 320 with the transmission rate of the component serviced by the T1 interface card 320. During operation, the T1 interface 500 extracts a clock signal embedded within the received data stream and uses the extracted clock for transmitting data over the same trunk. This advantageously allows a switching system embodying the present invention to accept a call from one carrier and route the call to a different carrier. Any shifts or skews that exist in the transmission timing between the two carriers are absorbed by the switching system. The switching system is not dependent upon the various carriers to sync up the signals. Thus, an operator using a switching system embodying the present invention can avoid the payment of up-charges invoked by using other carriers to frame the signals. Finally, the T1 interface 500 pulse code modulates the data and transmits the data over trunk 210.

Real-time Billing Records

The present invention allows an exemplary switching system generating billing records in real-time. When a virtual connection is established between a source component and a destination component, the switching system keeps track of the billing parameters. For instance, the switching system records the source identification of the party or equipment originating the call. Once a virtual connection is established, the switching system notes the start time of the virtual connection and the termination time. At this point, the switching system has the information required to generate a billing record.

On-line Configurable

The switching system of the present invention can be reconfigured during on-line operation. In an exemplary embodiment, the internal host system of the switching system provides a user interface for editing and modifying the configuration of the switching system. New DID numbers can be added to the switching system, hunt groups can be modified, and DID numbers can be deleted from the switching system. In addition, the use of trapezoidal drivers on each of the T1 interface cards allow the cards to be inserted or removed from the switching system during operation. Thus, when the characteristics of the telecommunications system change, the exemplary switch can be reconfigured without having to power down the switching system and disrupt service.

CONCLUSION

From the foregoing description, it will be appreciated that the present invention provides a switching system and a method for performing high-speed switching within a telecommunications system. One aspect of the present invention utilizes an internal host and a self learning routing algorithm to reduce the amount of time required to identify an output channel for routing a communication. Thus, a switching system is able to identify an output channel for an incoming call without being penalized by the overhead associated with querying an external database. This aspect of the present invention allows a switching system to reduce the call hold time, and thereby efficiently utilize the band width in meeting the call flow demands of the telecommunications system. Another aspect of the present invention is the use of a hashing algorithm in resolving routing decisions. The hashing algorithm operates on received DID numbers to identify an output channel for a received call. The hashing algorithm is able to accept any DID number as input. Therefore, this aspect of the present invention allows a switching system to quickly resolve routing decisions without requiring consecutive DID numbers. This aspect of the present invention also allows a switching system to perform true, ten digit portability of DID numbers. The ability of the hashing algorithm to accept any DID number without penalizing performance allows a switching system to service various types of equipment and services. Another aspect of the present invention is buffering the data between various components of the telecommunications system to eliminate problems due to skew between the transmission clocks of the various components. This aspect of the present invention allows the transmission of the data to be delayed by at least one frame length and then uses the clock rate of the destination component to ensure that clock skew is eliminated.

The present invention has been described in relation to particular embodiments which are intended in all respects to be illustrative rather than restrictive. Those skilled in the art will understand that the principles of the present invention may be applied to, and embodied in, various configurations of program modules and hardware devices.

Alternative embodiments will become apparent to those skilled in the art to which the present invention pertains without departing from its spirit and scope. Accordingly, the scope of the present invention is described by the appended claims and supported by the foregoing description.

We claim:

1. A method for switching a plurality of communication channels functionally connected to a switching system within a telecommunications system, comprising the steps of:

receiving a request for service at the switching system on a first communication channel, the request for service including a destination identifying number that can be any one of the domain of all available destination identifying numbers identifying an intended destination within the telecommunications network;

providing the destination identifying number to a host system operating internally to the switching system;

in response to providing the destination identifying number, obtaining the identity of a second communication channel from the host system, the second communication channel being associated with the intended destination and being determined as a function of each digit within the destination identifying number; and routing the data associated with the request for service on the second communication channel.

2. The method of claim 1, wherein the host system includes a hashing algorithm and a routing database, the hashing algorithm being operative to generate a database key as a function of each digit of the destination identifying number, the routing database being indexed by the database key and defining a relationship between each of a plurality of destination identifying numbers receivable by the switching system and the plurality of communication channels, and the step of obtaining a second communication channel comprises the host system steps of:

executing the hashing algorithm on the destination identifying number to obtain a database key;

accessing the routing database with the database key to obtain a hunt group of communication channels associated with the destination identifying number; and selecting a second communication channel from the hunt group.

3. The method of claim 2, wherein the routing database further defines a substitute number for at least one of the plurality of destination identifying numbers receivable by the switching system, the substitute number representing the physical telephone number assigned to the intended destination, further comprising the step of:

in response to providing the destination identifying number, obtaining a substitute number for the received destination identifying number; and transmitting the substitute number over the second communication channel.

4. The method of claim 2, wherein the switching system includes an interface card for servicing a subset of the plurality of communication channels including the first communication channel, the interface card maintaining a routing table, and further comprising the steps of:

storing in the routing table, information associating the destination identifying number with the hunt group of communication channels;

receiving a subsequent request for service at the switching system on any one of the subset of communication channels, the subsequent request for service including the destination identifying number;

accessing the routing table with the destination identifying number to obtain the hunt group of communication channels; and     routing data associated with the subsequent request for service on a third communication channel selected from the hunt group of communication channels.

5. A switching system for switching between various components of a telecommunications system functionally connected to the switching system, comprising:

a first interface card and second interface card, each of the first and second interface cards including a memory device, the first interface interfacing to the telecommunications system over a first trunk, and the second interface card interfacing to the telecommunications system over a second trunk;

a system bus electrically coupling the memory device of the first interface card with the memory device of the second interface card; and     an internal host electrically coupled to the first and second interface cards and being operative to identify available output channels associated with any one of a plurality of destination identifying numbers receivable by the switching system;

the first interface card being operative to:

detect an initiation of a communication on an input channel of the first trunk;

extract a DID number from the input channel, the DID number identifying an intended destination component, the intended destination component being functionally connected to the second interface card through the second trunk line;

provide the DID number to the internal host;

in response to providing the DID number to the internal host, receive the identification of an available output channel of the second trunk, the output channel being associated with the intended destination;

extract data from the input channel;

store the extracted data at a fixed memory location reserved for the input channel in the memory device of the first interface card;

transfer the data from the memory device of the first interface card to the memory device of the second interface card over the system bus; and     the second interface card being operative to:

extract the data received on the input channel of the first trunk from a fixed memory location reserved for the input channel of the first trunk in the memory device of the second interface card; and     transmit the data over the available output channel to the intended destination.

6. The switching system of claim 5, wherein the second interface card is further operative to:

receive data from the second trunk line;

detect a clock signal embedded within the received data received; and     use the detected clock signal as the basis of transmitting the data over the reserved output channel, whereby any skew existing between the input channel of the first trunk and the output channel of the second trunk is eliminated.

7. The switching system of claim 5, wherein data received over the second trunk is formatted as T1 frames and includes an embedded clock signal, and wherein the memory device can buffer the data extracted from multiple frames, and the second interface board is further operative to:

extract the embedded clock signal from the data received over the second trunk;

delay the step of transmitting the data over the available output channel by at least the transmission duration of one frame; and     use the extracted clock signal as the basis of transmitting the data over the available output channel, whereby any skew existing between the input channel and the output channel is eliminated.

8. A switching system for connecting a plurality of components within a telecommunications system, comprising:

a plurality of interface devices, each particular interface device being operative to receive and transmit data over the 24 channels of a T1 frame transferred between the particular interface device and a particular component within the telecommunications system, and including a controller system and a memory system;

the memory system for each of the plurality of interface devices including an incoming data buffer providing a unique memory storage location for each of the 24 channels and an outgoing data buffer providing a unique memory storage location for each of the 24 channels of each of the plurality of interface devices;

a system bus for transferring information from each unique memory storage location in the incoming data buffers of each of the plurality of interface devices to a corresponding unique memory storage location in each of the outgoing data buffers of each of the plurality of interface devices;

the switching system being operative to:

detect a communication initiation on an input channel of a T1 frame received at a first interface device and being transmitted by a source component;

extract a destination identifier from the input channel, the extracted destination identifier corresponding with a destination component;

identify an available output channel of a T1 frame transmitted by a second interface device functionally connected to the destination component identified by the destination identifier; and     establish a virtual connection between the input channel and the available output channel through the memory system and the system bus, the virtual connection comprising the unique memory location in the incoming data buffer reserved for the input channel and the unique memory location in the outgoing data buffer reserved for the input channel, whereby data is transferred from the input channel to the output channel by storing the data in the unique memory location reserved for the input channel in the incoming data buffer and extracting data from the unique memory location reserved for the input channel in the outgoing buffer.

9. The switching system of claim 8, wherein the switching system includes an internal host electrically coupled to each of the plurality of interface devices, and the switching system is operative to identify an output channel of a T1 frame transmitted by a second interface device by:

maintaining a routing database in the internal host, the routing database associating each of a plurality of destination identifiers receivable by the switching system with at least one of a plurality of hunt groups, each particular hunt group identifying at least one of the plurality of interface devices and at least one output channel of the T1 frame transmitted by the identified interface devices to a component identified by the destination identifier;

providing the extracted destination identifier as an input to a hashing algorithm within the internal host;

in response to providing the extracted destination identifier, receiving a database key from the hashing algorithm;

accessing the routing database with the database key to identify a particular hunt group; and     examining each of the output channels identified by the particular hunt group to identify the available output channel of the T1 frame transmitted by the second interface card.

10. The switching system of claim 9, wherein the destination identifiers are ten digit DID numbers and the hashing algorithm is operative to receive any of the possible combinations of DID numbers.

11. The switching system of claim 9, wherein each of the plurality of interface cards is operative to detect a signaling clock embedded within the received T1 frames and transmit T1 frames to the at a data rate derived from the detected signaling clock.

12. The switching system of claim 9, being further operative to:

detect a communication termination on the input channel of a T1 frame received at the first interface device and being transmitted by the source component; and     terminate the virtual connection between the source component and the destination component.

13. The switching system of claim 12, being further operative to:

extract a source identifier from the initial communication, the extracted source identifier corresponding with the source component;

record a start time, the start time being the point in time of establishing the virtual connection;

record an end time, the end time being the point in time of terminating the virtual connection; and     provide the source identifier, start time, and end time as real-time input to a billing system functionally connected to the switching system.

14. A switching system for interconnecting components within a telecommunications system including other switching systems, private branch exchanges, cellular switching systems, personal communication systems, and paging systems, comprising:

at least two interface devices, each interface device being functionally and uniquely connected to one component within the telecommunications system and being operative to receive and transmit data on any of a plurality of channels within a T1 frame transferred between the interface device and the connected component;

an internal host electrically coupled to each interface device for providing routing information; and     a memory system electrically coupled to each interface card;

the switching system being operative to:

receive a communication initiation on an input channel of a T1 frame received by a first interface card, the first interface card being functionally and uniquely connected to a source component;

extract a DID number from the input channel, the extracted DID number corresponding with a destination component within the telecommunications system;

query the internal host with the extracted DID number;

in response to receiving the query, the internal host being operative to:

provide the extracted DID number as input to a hashing algorithm;

in response to providing the extracted DID number, receive a channel list identifying at least one output channel of a T1 frame transmitted by the second interface device that is functionally and uniquely connected to the destination component;

examine the output channels identified in the channel list to identify an available output channel of the T1 frame transmitted by the second interface card; and     if an available output channel exists, provide the identify of the available output channel to the switching system;

the switching system, in response to receiving the identity of the available output channel is further operative to:

for each subsequent T1 frame received at the first interface card, extract the data from the input channel of the subsequent T1 frame and store the data into a unique input memory area of the memory system reserved for the input channel;

transfer the data from the unique input memory area for the input channel to a unique output memory area of the memory system reserved for the input channel;

delaying until the beginning of the next available time slot for the output channel in the T1 frame transmitted by the second interface card;

retrieving the data from the unique output memory area;

and injecting the data into the output channel of the T1 frame transmitted by the second interface card.

15. A method for switching a plurality of communication channels functionally connected to a switching system within a telecommunications system, comprising the steps of:

receiving a request for service at the switching system on a first communication channel, the request for service including a ten-digit destination identifying number that can be any one of the domain of all available ten-digit destination identifying numbers and that identifies an intended destination within the telecommunications network;

providing the destination identifying number to a host system;

in response to providing the destination identifying number, translating the destination identifying number, as a function of all ten-digits, into a hunt group number, the function allowing a mapping of destination identifying numbers to hunt groups on a singular basis;

obtaining the identity of a second communication channel from the hunt group, the second communication channel being associated with the intended destination; and     routing the data associated with the request for service on the second communication channel.

\* \* \* \* \*